United States Patent Office 3,423,384
Patented Jan. 21, 1969

3,423,384
PROCESS FOR THE PREPARATION OF SUBSTANTIALLY ASH-FREE POLYMERS
Hugh John Hagemeyer, Jr., and Vernon K. Park, Longview, Tex., assignors to Eastman Kodak Company, Rochester, N.Y., a corporation of New Jersey
No Drawing. Continuation of application Ser. No. 218,140, Aug. 20, 1962. This application Mar. 31, 1967, Ser. No. 627,556
U.S. Cl. 260—93.7
Int. Cl. C08f 1/88, 3/06, 3/10

9 Claims

ABSTRACT OF THE DISCLOSURE

Process for purifying a solution of polymers of olefinic hydrocarbons prepared at temperatures above their melting points by first removing from about 50 to 95% of solid catalyst residue by mechanical means such as filtration or centrifiugation, concentrating the polymer solution, and then contacting the concentrated solution in solid particulate form with a liquid non-polar hydrocarbon containing about .1 to about 10%, by weight, of a chelating agent to obtain a substantially ash-free, odor-free, thermally stable, and noncorrosive polymer.

---

This application is a continuation of application Ser. No. 218,140, filed Aug. 20, 1962, now abandoned.

This invention relates to a process for the preparation of solid olefinic hydrocarbon polymers. More particularly, this invention relates to a process for the preparation of substantially odor-free, ash-free, noncorrosive solid olefinic hydrocarbon polymers. In a specific aspect, this invention relates to a process in which solid olefinic hydrocarbon polymers are obtained in a form which is substantially free of solid stereospecific polymerization catalyst residue.

In recent years solid, high molecular weight polymers which are partially or substantially crystalline have been prepared from olefinic hydrocarbons such as ethylene and propylene by low pressure polymerization of the monomer in the presence of solid stereospecific polymerization catalysts. Such polymers have been used extensively in a number of different applications including for example use in fibers, molding and coating applications. These polymers are, however, deficient for many uses because they contain metal contaminants (ash) caused primarily by the catalyst systems used in their preparation. It is particularly difficult to obtain polymers free of catalyst residues because they are present in the polymerization partly in dissolved form, partly as solid particles and partly in a form completely enclosed by the polymer. The quantities of ash present in the aforementioned polymers vary from about .3 to about .5 weight percent and cause the polymer to discolor badly during processing or unfavorably affect the electrical properties of the polymer. In addition, these relatively high ash contents cause the polymer to exhibit a disagreeable odor, to exhibit some degree of instability and to corrode materials commonly used in processing apparatus. Polymers having ash contents as high as .05 weight percent have been found to be satisfactory for some commercial applications but for many other applications these polymers should be substantially free of ash, i.e. exhibit ash contents of .01 weight percent or less. Thus, the tendency of polymers to darken or degrade upon being shaped, molded or otherwise formed into structures, particularly when exposed to heat or upon exposure to light is, for all practical purposes, eliminated when the ash content of the polymer is .01 weight percent or less. It is obvious, therefore, that a simple, direct and commercially feasible process for preparing high molecular weight polymers of olefinic hydrocarbons substantially free of ash, i.e. exhibiting ash contents of less than .01 weight percent, would substantially enhance the art.

Accordingly, it is an object of this invention to provide a process for the preparation of polymers of olefinic hydrocarbons which are substantially free from inorganic residual ash constituents of the catalysts used in their preparation.

Another object of this invention is to provide a process for the preparation of substantially odor free, ash free, noncorrosive, solid polymers of olefinic hydrocarbons.

Another object of this invention is to provide a simple, direct and commercially feasible process for the preparation of solid, high molecular weight polymers of olefinic hydrocarbons which are substantially free of ash.

Still another object of this invention is to provide a solid olefinic hydrocarbon polymer, such as polypropylene, which has been prepared with a catalyst containing at least one heavy metal compound which polymer is stable to heat and light in the absence of stabilizers other than antioxidants.

Still another object of this invention is to provide a process for the preparation of α-olefinic hydrocarbons at high temperatures which exhibit substantially no ash content.

Other objects of this invention will be apparent from an examination of the description and claims which follow.

In accordance with this invention, it has been found that polymers of olefinic hydrocarbons prepared at temperatures above their melting points can be substantially freed from inorganic residual constituents of the solid stereospecific catalysts used in their preparation by first removing the major portion of solid catalyst residue by mechanical means such as filtration or centrifiugation and then contacting the polymer, in solid particulate form, with a liquid nonpolar hydrocarbon containing about .1 to about 10%, by weight, of a chelating agent to obtain a substantially ash-free, odor-free, thermally stable, noncorrosive polymer.

The process described above is extremely effective and will provide a solid polymer exhibiting substantially no ash content. The residual metal contaminants using this process can easily be reduced to less than 20 parts per million, thus resulting in a polymer having commercial utility in a number of fields of application. In addition, these polymers have substantially no color upon extrusion and can be readily stabilized with antioxidants. In contrast, filtration of a polymer solution or melt to remove the major portion of catalyst residues, followed by extraction of the polymers with a light hydrocarbon, such as pentane, hexane or heptane containing no chelating agent does not provide a polymer having the extremely good color and electrical properties obtained in the process of this invention. Thus, catalyst residues as substantial as 200 to 500 parts per million, depending upon the molecular weight of the polymer, are generally present in polymer products prepared at high temperatures and purified by such filtration and extraction procedures. Polymers containing these high concentrations of catalyst residue, when subsequently molded or otherwise shaped in the presence of heat, tend to darken which, of course, seriously restricts the utility of these polymers. Furthermore, the presence of metal catalyst contaminants, for example, aluminum or titanium in solid α-olefinic hydrocarbon polymers tends to induce darkening on exposure to light, particularly daylight, in a manner which is analogous to the phenomenon which occurs in ceramic glazes when aluminum or heavy metal compounds are present. While antioxidants and like compounds may sometimes be employed to stabilize organic materials against the effects of degradation induced by exposure to light and heat, the efficacy of such materials is often greatly diminished or even nullified in the presence of oxidation catalysts such as are found in the catalyst residues remaining in polymer products prepared according to prior art procedures. As already indicated, however, the process of this invention provides a substantially ash-free, odor-free, thermally stable, noncorrosive solid olefinic hydrocarbon polymer.

Generally, prior art processes used for preparing solid, olefinic hydrocarbon polymers have included a separate extraction step in order to remove low molecular weight amorphous and greasy portions from the gross polymer in order to obtain a highly crystalline polymer exhibiting improved physical properties including, for example, stiffness and density. The process of the present invention is unique in that amorphous and greasy fractions of the gross polymer are removed simultaneously with removal of catalyst residue. Thus, the practice of this invention makes the separate step for extracting low molecular weight amorphous and greasy polymer usually associated with prior art processes unnecessary. In addition, the catalyst residues which are removed from the polymer solution or melt by mechanical means, for example, by filtration or centrifugation, can be easily recycled to the synthesis section of the polymerization process for reuse without any intermediate purificataion steps. This is, of course, an added commercial attraction of the process of this invention.

The olefinic hydrocarbon polymers that are employed in the practice of this invention are solid polymers prepared from normally gaseous olefinic hydrocarbons. The invention is of particular importance in the preparation of highly crystalline polymers such as polyethylene, polypropylene, polybutenes and polystyrene although it can be practiced with any of the solid polymers prepared from α-monoolefinic hydrocarbons, desirably containing 2–10 carbon atoms, and most preferably 2–3 carbon atoms, such as for example ethylene, propylene, butene-1, hexene-1, heptene-1, decene-1, styrene and the like. Also copolymers such as block copolymers and graft copolymers prepared from the aforementioned olefinic hydrocarbons can be used in the practice of this invention.

The catalysts that are employed in the formation of these solid polymers include the anionic solid stereospecific polymerization catalysts formed by reacting reducing compounds with reducible metal compounds which catalysts are effective to form solid polymer, as distinguished from liquid polymer, under the conditions of reaction. The reducing compounds can be alkali metals, for example, sodium, potassium or lithium metal, hydrides of such metals such as lithium aluminum hydride and/or alkyl compounds of these metals, for example, lithium alkyls, or lithium aluminum tetraalkyls. Specific examples of such reducing agents include lithium, sodium, potassium, lithium aluminum tetrabutyl, lithium butyl, sodium amyl, potassium propyl, lithium aluminum hydride, sodium aluminum hydride, sodium hydride, lithium hydride, lithium aluminum tetraethyl, lithium aluminum tetrahexyl and the like.

The reducible metal compounds that are generally employed in catalysts to form solid polymers from α-monoolefinic hydrocarbons are compounds of transition metals selected from the 4th to the 6th groups of the periodic table. The preferred transition metals are titanium, vanadium, chromium, molybdenum and/or tungsten. It is generally desirable to employ the halides of these transition metals at their maximum valence or at a reduced valence. Preferred reducible metal compounds include the subvalent chlorides of titanium, vanadium, chromium, molybdenum and/or tungsten although bromides and iodides are often used. Examples of the reducible metal compounds that can be used include halides, such as chlorides and bromides or oxychlorides. Most commonly used transition metal compounds are titanium tetrachloride, titanium trichloride, vanadium tetrachloride and vanadium trichloride, but halides of the other transition metals can also be used. The molar ratio of the reducing compound to reducible metal compound in the catalyst is generally in the range of about 0.1:1 to about 10:1 and preferably in the range of about 0.5:1 to about 1.5:1. If desired, an additional component can be employed in order to increase the stereospecificity of the catalyst. Suitable third components include the alkali metal halides, diaryl ethers and metal oxides or alkoxides as exemplified by sodium fluoride, diphenyl ether and oxides or alkoxides of calcium, magnesium or aluminum. These additional catalyst components are usually employed in molar ratios in the range of about 0.25:1 to about 1:1 of the reducible transition metal compound to third component.

The polymerization reaction and the conditions under which it is carried out have been described in detail in the prior art. Generally, however, the polymerization reaction is carried out at a pressure in the range of about atmospheric to about 2,000 atmospheres. Usually pressures greater than 15 atmospheres, and preferably in the range of about 15 to 300 atmospheres are employed in order to obtain commercially satisfactory rates. The polymerization reaction is carried out at temperatures above the melting point of the polymer being formed which temperatures are generally above 120° C. and are often at least 140° C. The preferred temperatures being in the range of about 150 to about 250° C., although temperatures up to about 300° C. are suitable. At these high temperatures the catalyst is employed in concentrations of about .01 to about 5%, by weight, based on the monomer or monomers being polymerized with preferred catalyst concentrations being in the range of about .1 to about 1%, by weight. Lower catalyst concentrations can be employed, but generally the rate of polymer formation is quite slow and at higher catalyst concentrations some difficulty is encountered in controlling the reaction. The concentration of the catalyst employed will generally depend upon the method of operation, for example, low catalyst concentrations would be used where high polymer to catalyst yields are desired. On the other hand, high catalyst concentrations are employed where high polymer yields per unit of reactor space are desired.

The polymerization reaction can be carried out in the presence or absence of an inert organic liquid vehicle. When the polymerization is carried out in the presence of an inert organic liquid vehicle, this vehicle can be any of the inert organic liquids which contain no combined oxygen and which are free of water, alcohol, ether or other compounds containing oxygen or compounds containing unsaturation. Thus, the organic vehicle employed, if any, can be an aliphatic alkane or cycloalkane such as pentane, hexane, heptane or cyclohexane, or a high molecular weight liquid paraffin or mixture of paraffins which are liquid at the reaction temperature, or an aromatic hydrocarbon such as benzene, toluene, xylene or the like, or a halogenated aromatic compound such as chlorobenzene. A petroleum fraction of suitable boiling range such as odorless mineral spirits (a sulfuric acid washed paraffinic hydrocarbon boiling at 180°–200° C.) will give particularly good results. In addition, good results can be obtained when the polymerization is carried out in the presence of a dense gas such as highly compressed ethylene and/or propylene by operating at elevated pressures.

Upon completion of the polymerization reaction described hereinbefore, the major portion of the catalyst residue, i.e. at least 50% and desirably 90–95%, by weight, or more is removed from the polymer solution or melt mechanical means such as filtration or centrifugation at elevated temperatures, i.e. above the melting point of the polymers. The catalyst removed in this way can, as already indicated, be recycled to the synthesis section of the polymerization. After the removal of the major portion of the solid catalyst residues, the polymer, in solid form, is contacted with a light aliphatic hydrocarbon solvent such as pentane, hexane or heptane or an aromatic solvent such as benzene, toluene or xylene containing 0.1 to 10 weight percent of a chelating agent, preferably a 1,3-dicarbonyl compound, to remove the remaining catalyst residues simultaneously with the low molecular weight amorphous and greasy portions of the polymer. As pointed out hereinbefore, the preferred chelating agents used in the practice of the present invention are 1,3-dicarbonyl compounds such as diketones, keto esters and/or keto acids, the diketones and keto esters being particularly effective. In general, the chelating agents that can be employed in practicing this invention are liquid 1,3-dicarbonyl compounds having the formula:

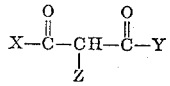

Where X, Y and Z are the same or different groups selected from the following: hydrogen, hydroxy, alkoxy containing 1–6 carbon atoms, saturated aliphatic hydrocarbon, e.g. alkyl containing 1–6 carbon atoms, and aryl radicals, e.g. phenyl or hydrocarbon substituted phenyl radicals. Such chelating agents have been extensively described in the prior art and include, for example, acetylacetone and ethyl aceto acetate as the preferred agents. It has been found most desirable to employ the chelating agent in an amount such that it has a concentration of from .1 to 10 weight percent, preferably from .5 to 5 weight percent in the nonpolar hydrocarbon such as pentane, hexane, heptane, benzene, toluene, or xylene. The extraction operation can be carried out on a batch or continuous basis and may also be carried out in a single or multistage operation by contacting the nonpolar hydrocarbon containing the chelating agent, at temperatures in the range of about 0 to about 100° C. with the polymer in solid form.

As already indicated, the catalyst residue and low molecular weight greasy or amorphous portions can be simultaneously removed from the gross polymer after it has been freed of the major portion of catalyst residue by mechanical means such as filtration. However, the extraction operation can also be carried out in a separate operation in which the gross polymer solution, after substantial removal of the solid catalyst residue, is first concentrated and the solid polymer extruded, pelletized and pentane, hexane or heptane extracted to remove low molecular weight greasy or amorphorus portions. Subsequently the polymer pellets can be contacted with nonpolar hydrocarbons containing chelating agent. When operating in this manner the chelating agent in nonpolar hydrocarbon can be easily recycled and the pellets removed continuously to a drier. Generally the contacting of a solid polymeric material with the extracting liquid is carried out at temperatures of 0 to 100° C., desirably about 60 to about 95° C. and preferably 70 to about 90° C. Residence times in the range of about 2 to about 12 hours for solid polymer in the extraction column are generally satisfactory.

This invention can be further illustrated by the following examples of preferred embodiments thereof although it will be understood that these examples are included merely for purposes of illustration and are not intended to limit the scope of the invention unless otherwise specifically indicated.

Example 1

To a two-liter stirred autoclave is charged a catalyst mixture composed of 5.36 g. (0.232 atom) of sodium metal dispersion and 17.9 g. (0.116 mole) of titanium trichloride in 1000 ml. of mineral spirits. The autoclave is purged with ethylene, sealed, heated to 200° C. and ethylene is pumped into a pressure of 1000 p.s.i.g. Agitation is begun and the reaction allowed to proceed 10 hours. The polymer solution is filtered through a plate and frame filter, concentrated, extruded, and chopped into pellets. The polyethylene produced amounts to 355 grams having a density of 0.956.

The polyethylene pellets are extracted with hexane alone and hexane containing 2 weight percent acetylacetone in a Soxhlet extractor. The results are as follows:

| Agent | Ash | Color* |
|---|---|---|
| Hexane | .032% | 3–4 |
| Hexane+2% acetylacetone | .002% | 1 |

*Color rating in this and the following examples is based on an arbitrarily selected four division color scale which proceeds from a very white polymer of 1, comparable in color to the whitest commercially available polymer to 4 which is a straw-colored product. The samples for color evaluation are prepared by molding a button ⅛" thick at 160° C.

Example 2

Polypropylene having an inherent viscosity of 2.0 (determined at 145° C. in tetralin using a 0.25 weight percent polymer solution) is prepared by introducing into a 500-gallon stainless steel, agitated, jacketed reactor, 200 gallons of mineral spirits, 40 g. lithium aluminum hydride, 160 g. titanium trichloride and 46 g. sodium fluoride. After agitating and heating to 150° C., propylene gas is introduced to a pressure of 800–1000 p.s.i.g. The temperature is maintained at 150° C. After 18 hours reaction time the polymer solution containing 30 weight percent polymer is pumped to a dilution tank where it is diluted to 10 weight percent. The major portion of the catalyst in the polymer solution is removed in a pressure centrifuge and recycled to the synthesis section. The polymer solution is concentrated, extruded and pelletized. The propylene pellets are transferred to a column and hexane extracted at 70° C. for 10 hours followed by a countercurrent extraction with heptane containing 5 weight percent acetylacetone at 90° C. for 6 hours. The polymer is then washed with n-heptane and dried. The results are as follows:

| Agent | Color | Ash, percent | Parts/million | | |
|---|---|---|---|---|---|
| | | | Al | Ti | Fe |
| Hexane | 3 | .052 | 165 | 83 | 4 |
| Hexane+5% acetylacetone | 1 | .005 | <1 | 4 | 2 |

Samples of the above gross polypropylene are extracted directly with heptane+5% acetylacetone. The results are as follows:

| Sample | Hexane extracted | | Heptane acetylacetone (5%) | |
|---|---|---|---|---|
| | Color | Ash, percent | Color | Ash, percent |
| A | 3–4 | .047 | 1 | .009 |
| B | 3–4 | .024 | 1 | .002 |
| C | 3–4 | .029 | 1 | .0007 |
| D | 2–3 | .045 | 1 | .005 |
| E | 2–3 | .024 | 1 | .005 |

Additional runs are performed on samples of polymer produced as above using ethyl acetoacetate as the chelating agent. The results are as follows.

| Sample | Heptane extracted | | Heptane-ethyl acetoacetate (5%) | |
|---|---|---|---|---|
| | Color | Ash, percent | Color | Ash, percent |
| A | 3–4 | .045 | 1 | .008 |
| B | 3–4 | .022 | 1 | .003 |
| C | 3–4 | .025 | 1 | .009 |
| D | 2–3 | .046 | 1 | .007 |
| E | 2–3 | .025 | 1 | .005 |

Example 3

As already indicated, solid polymers prepared from more than one olefinic hydrocarbon can be employed in the process of this invention. Thus, to a two-liter stirred autoclave is charged a catalyst comprising 0.60 g. lithium aluminum hydride, 2.46 g. titanium trichloride and 0.40 magnesium oxide and 900 ml. of mineral spirits. The autoclave is sealed, purged with propylene and heated to 150° C. Propylene is pumped into the reactor to 800 p.s.i.g. and agitation begun. After 10 minutes a rise in temperature to 170° C. is noted and polymerization proceeds with a drop in pressure to 500 p.s.i.g. Ethylene is admitted to the autoclave to a pressure of 1000 p.s.i.g. and the polymerization reaction proceeds an hour longer. The polymer solution is filtered through a plate and frame filter, concentrated, extruded and chopped into pellets. A yield of 302 grams of polymer of propylene and ethylene is obtained, having an inherent viscosity of 2.10. This polymer is extracted with hexane, heptane-acetylacetone and heptane-ethyl acetoacetate. The results are as follows:

|  | Hexane extracted | Heptane+5% acetylacetone | Heptane+5% ethyl-acetoacetate |
|---|---|---|---|
| Ash, percent | .09 | .002 | .004 |
| Color | 3–4 | 1 | 1 |

Thus, by the practice of this invention there is provided a commercially feasible process for the preparation of solid olefinic hydrocarbon polymers which are substantially free of ash. As a result of their very low ash contents these polymers are substantially odor free, noncorrosive polymers and exhibit particularly good electrical properties and color. The polymers can, therefore, be substituted in those applications which require polymers exhibiting their combination of outstanding properties.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. Process of purifying a solution of crude polymer which has been produced by polymerizing an alpha-olefinic hydrocarbon in an inert liquid medium at a temperature sufficient to cause the polymer to dissolve in said medium and in the presence of a solid steriospecific catalyst, comprising mechanically removing a major portion of solid catalyst residue from the polymer solution, concentrating said polymer solution, pelletizing the concentrate and thereafter contacting the pelletized concentrated polymer solution with a non-polar hydrocarbon solvent for amorphous olefin polymer, said solvent containing about .10 to 10% by weight, of a chelating agent to simultaneously remove catalyst residue and amorphous and greasy fractions of the gross polymer.

2. Process of claim 1 in which said chelating agent is a 1,3-dicarbonyl compound.

3. Process of claim 2 in which the pelletized concentrated polymer is contacted at a temperature in the range of 0 to 100° C. with said solvent and said chelating agent.

4. Process of claim 1 in which said solvent is hexane and said chelating agent is acetyl acetone.

5. Process of claim 1 in which said solvent is heptane and said chelating agent is acetyl acetone.

6. Process of claim 1 in which said alpha-olefinic hydrocarbon is ethylene; said catalyst is sodium and titanium trichloride; said solvent is hexane; and said chelating agent is acetyl acetone present in the amount of about 2% by weight.

7. Process of claim 1 in which said alpha-olefinic hydrocarbon is propylene; said catalyst is lithium aluminum hydride, titanium trichloride and sodium fluoride; said solvent is heptane; and said chelating agent is acetyl acetone present in the amount of about 5% by weight.

8. Process of claim 1 in which said alpha-olefinic hydrocarbon is propylene; said catalyst is lithium aluminum hydride, titanium trichloride and magnesium oxide; said solvent is hetpane; and said chelating agent is ethyl acetoacetate present in the amount of about 5% by weight.

9. Process of claim 1, in which said major portion of solid catalyst residue is removed by filtration.

References Cited
UNITED STATES PATENTS 3,098,845   7/1963   Cull _____ 260—94.9

OTHER REFERENCES

Sittig, "Polyolefin Resin Processes," p. 121, 1961.

JOSEPH L. SCHOFER, *Primary Examiner.*

L. EDELMAN, *Assistant Examiner.*

U.S. Cl. X.R.

260—94.9, 93.5, 878